US008484139B2

(12) United States Patent
Hori et al.

(10) Patent No.: US 8,484,139 B2
(45) Date of Patent: Jul. 9, 2013

(54) DATA CLASSIFICATION METHOD AND APPARATUS

(75) Inventors: Yoshinari Hori, Hitachinaka (JP); Akihiro Yamada, Tokai (JP); Takuya Yoshida, Hitachinaka (JP); Jinichiro Goto, Mito (JP)

(73) Assignee: Hitachi, Ltd., Tokyo (JP)

( * ) Notice: Subject to any disclaimer, the term of this patent is extended or adjusted under 35 U.S.C. 154(b) by 931 days.

(21) Appl. No.: 12/187,760

(22) Filed: Aug. 7, 2008

(65) Prior Publication Data

US 2009/0043716 A1 Feb. 12, 2009

(30) Foreign Application Priority Data

Aug. 8, 2007 (JP) ................................. 2007-206858

(51) Int. Cl.
*G06F 15/18* (2006.01)
(52) U.S. Cl.
USPC ............................................................ 706/12
(58) Field of Classification Search
USPC .............................................. 706/12, 20, 62
See application file for complete search history.

(56) References Cited

U.S. PATENT DOCUMENTS

| 5,142,590 | A | 8/1992 | Carpenter et al. | |
|---|---|---|---|---|
| 5,214,715 | A | 5/1993 | Carpenter et al. | |
| 2001/0014776 | A1* | 8/2001 | Oriol et al. | 600/511 |
| 2006/0210133 | A1* | 9/2006 | Krishnan et al. | 382/128 |
| 2008/0091627 | A1* | 4/2008 | Hosoi et al. | 706/12 |

FOREIGN PATENT DOCUMENTS

JP 63-501455 6/1988

OTHER PUBLICATIONS

Giorgio Giacinto and Fabio Roli, "Methods for Dynamic Classifier Selection" International Conference on Image Analysis and Processing, 1999. Proceedings, Issue Date: 1999 on pp. 659-664, Date of Current Version: Aug. 6, 2002.*
Furao et al, "An enhanced self-organizing incremental neural network for online unsupervised learning", Received Apr. 26, 2006; received in revised form Jul. 12, 2007; accepted Jul. 12, 2007.*
T. Ogura, et al., E-SOINN:Enhanced Self-Organizing Incremental Neural Network, vol. 106, No. 589, Mar. 8, 2007, pp. 147-152.
T. Kosaka, eta l., US Dollar Classifications by the LVQ Method Based on Reliability Criterion, 1999, vol. 4, pp. 493-504.
Carpenter et al., "ARTMAP: Supervised Real-Time Learning and Classification of Nonstationary Data by a Self-Organizing Neural Network", Neutral Networks, vol. 4, pp. 565-588, Feb. 1991.
Carpenter et al., "ART 2-A: An Adaptive Resonance Algorithm for Rapid Category Learning and Recognition", Neutral Networks, vol. 4, pp. 493-504, Jan. 1991.

* cited by examiner

*Primary Examiner* — Jeffrey A Gaffin
*Assistant Examiner* — Ilya Traktovenko
(74) *Attorney, Agent, or Firm* — Antonelli, Terry, Stout & Kraus, LLP.

(57) ABSTRACT

A data classification apparatus for classifying plural input data into plural categories, in which the apparatus includes a prototype select unit for selecting the prototype of the category nearest to the input data that has been read, a prototype evaluation unit for evaluating whether the selected prototype is proper, a prototype addition unit for adding a prototype in the case where the selected prototype is not proper and an internal data correcting unit for correcting at least one of the prototype and an area determining parameter specifying the size of the category area for each category in the case where the selected prototype is proper. The size of the category area can be set for each category, and therefore, the data can be properly classified and the judgment accuracy is improved in an application to fault detection and fault diagnosis.

4 Claims, 11 Drawing Sheets

FIG.7

| CATEGORY A \ CATEGORY B | NORMAL | FAULT 1 | FAULT 2 |
|---|---|---|---|
| CATEGORY 1 | O | — | — |
| CATEGORY 2 | O | — | — |
| CATEGORY 3 | — | O | — |
| CATEGORY 4 | — | O | — |
| CATEGORY 5 | — | — | O |
| CATEGORY 6 | — | — | O |
| CATEGORY 7 | — | — | O |
| CATEGORY 8 | — | O | — |
| CATEGORY 9 | O | — | — |
| CATEGORY 10 | O | — | — |

FIG.11

| DATE | TIME | INLET GAS TEMPERATURE | FUEL FLOW | TURBINE EXIT GAS TEMPERATURE | TURBINE SPEED | ENERGY GENERATED BY GENERATOR | OPERATION MODE | CATEGORY NO. | STATE |
|---|---|---|---|---|---|---|---|---|---|
| 2006/10/5 | 10:30:00 | 15.1 | 1.60 | 550 | 7280 | 27.0 | 0 | 58 | NORMAL |
| 2006/10/5 | 10:30:01 | 15.1 | 1.60 | 550 | 7280 | 27.0 | 0 | 58 | NORMAL |
| 2006/10/5 | 10:30:02 | 15.1 | 1.61 | 550 | 7279 | 27.0 | 0 | 58 | NORMAL |
| 2006/10/5 | 10:30:03 | 15.2 | 1.60 | 550 | 7279 | 27.0 | 0 | 58 | NORMAL |
| 2006/10/5 | 10:30:04 | 15.1 | 1.60 | 551 | 7280 | 27.0 | 0 | 58 | NORMAL |
| 2006/10/5 | 10:30:04 | 15.1 | 1.60 | 550 | 7280 | 27.0 | 0 | 58 | NORMAL |
| ... | ... | ... | ... | ... | ... | ... | ... | ... | ... |

FIG.12

| DATE | TIME | MAINTENANCE | FAULT EVENT | TROUBLE-SHOOTING MEASURE |
|---|---|---|---|---|
|  |  |  |  |  |
| 2006/10/8 | 9:50:00 |  | CONFIRM FAULT A |  |
| 2006/10/8 | 10:30:00 | START MAINTENANCE |  |  |
| 2006/10/8 | 10:45:00 |  |  | REPLACE ○○ |
| 2006/10/8 | 11:30:00 | END MAINTENANCE | RESTORE FAULT A |  |
| ⋮ | ⋮ | ⋮ | ⋮ | ⋮ |

FIG.13

| DATE | TIME | Ndata_1 (k) | Ndata_2 (k) | ⋯ | Ndata_5 (k) | STATE |
|---|---|---|---|---|---|---|
| 2006/10/7 | 9:30 | 0.75 | 0.54 | ⋯ | 0.38 | 1 |
| 2006/10/7 | 9:31 | 0.75 | 0.54 | ⋯ | 0.38 | 1 |
| 2006/10/7 | 9:32 | 0.75 | 0.56 | ⋯ | 0.4 | 1 |
| 2006/10/7 | 9:33 | 0.74 | 0.54 | ⋯ | 0.4 | 1 |
| ⋮ | ⋮ | ⋮ | ⋮ | ⋯ | ⋮ | ⋮ |

DATA CLASSIFICATION METHOD AND APPARATUS

BACKGROUND OF THE INVENTION

This invention relates to a data classification method and apparatus intended for application to a fault detection and fault diagnosis system.

One of the conventional data classification methods is "Adaptive Resonance Theory: ART" described in U.S. Pat. No. 5,142,590. The method ART, proposed by G. A. Carpenter and S. Grossberg in 1987, is a kind of the non-supervised learning network and has the function of classifying the input data into a plurality of categories.

The technique according to U.S. Pat. No. 5,142,590 uses an algorithm simulating the algorithm for pattern recognition by the human being and has the following features:

(1) An input pattern is exchanged between a feature representation field (F1) and a category representation field (F2), and the selection of a candidate for the category and the judgment of properness of the candidate are repeated thereby to determine a category.

(2) In the properness judgment, the parameter (vigilance parameter) for determining the size of the category area is used to judge whether the input pattern is displaced from the selected category area.

(3) Upon judgment that all the categories are not proper for the input pattern, a new category is created.

These features constitute an architecture applicable to various types of pattern recognition.

G. A. Carpenter et al., on the other hand, has proposed an architecture called ARTMAP as described in U.S. Pat. No. 5,214,715 by extending ART to the data classification technique of supervised learning type. According to this technique, the input data are classified into given categories by repeating the following steps 1 to 4:

Step 1: The input data are classified according to ART constituting a non-supervised data classification technique.

Step 2: The classified category (category A) is converted to a desired category (category B) into which the is to be classified.

Step 3: The converted category B is compared with the category B given as a teacher.

Step 4: In the case where the comparison shows that the categories fail to coincide with each other, the ART parameter is adjusted to select a new category A.

As described above, the conventional data classification technique uses a flexible algorithm adaptable to various data classification and various pattern recognition methods.

The application of the aforementioned algorithm to the fault detection or the fault diagnosis, however, poses two problems. One is that the accuracy of detection or diagnosis is reduced. This is attributable to the fact that the parameter (vigilance parameter) for determining the size of the category area remains the same for all the categories.

FIG. 2 is a schematic diagram showing the data classification using the ART technique. The dashed lines each schematically show a category area, and the data are classified into three categories. In category 1, the data are uniformly distributed in the category area. In categories 2 and 3, on the other hand, the data are concentrated at the center of the area. This is due to the fact that the parameter for determining the size of the category area assumes the same value for all the categories.

In the fault detection or the fault diagnosis, the data located in the neighborhood of the boundary of the area of category 2, for example, are separate from the existing data and may constitute a different event. In such a case, the judgment accuracy of ART is reduced.

FIG. 3 is a schematic diagram showing the data classified using the ARTMAP architecture. White circles indicate the data for a normal case, and black circles the data for a fault. From the relation of correspondence between category A with the input data classified by ART and category B given as a teacher (for example "normal" or "fault"), the relation between the input data and category B is learned. In the case of FIG. 3, categories A1 to A6 correspond to a "normal" case, and categories A7 to A9 correspond to a "fault". In the shown example, the data associated with categories A2 to A5 form a mass. Since each category is defined in a small area, however, the area surrounded by categories A2 to A5 belongs to no category. This is by reason of the fact that the area of category A7 is reduced to separate from categories A5, A6, with the result that the area of the other categories is also reduced.

In fault detection or fault diagnosis, this area can be judged as neither normal or faulty, and an increased number of these areas reduces the judgment accuracy.

The second problem is that since the algorithm of pattern recognition by the human being is simulated, the number of the processing steps is increased. In the case where the simplification of the process is required due to the restriction of the hardware packaged, therefore, the packaging work may become difficult.

SUMMARY OF THE INVENTION

In view of the problems of the prior art described above, it is an object of this invention to provide a data classification method and apparatus easily packaged without reducing the judgment accuracy in an application to fault detection and fault diagnosis.

In order to achieve the object described above, according to one aspect of the invention, there is provided a data classification method for classifying a plurality of input data in the natural world into a plurality of categories using the computer, comprising the steps of:

storing a category prototype and an area determining parameter for specifying the size of the category area in advance;

normalizing the input data;

selecting the category prototype most analogous to the normalized input data;

evaluating whether the prototype is proper based on the distance between the selected prototype and the input data; and correcting at least one of the area determining parameter and the prototype in the case where the prototype is judged as proper while adding a new prototype in the case where the prototype is not judged as proper.

The prototype evaluation described above is the judgment based on the distance between the input data and the prototype.

According to another aspect of the invention, there is provided a data classification method for classifying a plurality of input data in the natural world into a plurality of preset categories B using the computer, comprising the steps of:

storing the prototype of category A related to category B, an area determining parameter for specifying the size of the area of category A and a category correspondence matrix for converting category A to category B;

normalizing the input data;

selecting the prototype of category A most analogous to the normalized input data;

evaluating whether the prototype is proper or not based on the distance between the selected prototype and the input data;

adding a new prototype and repeatedly selecting the prototype in the case where the prototype is not judged as proper while correcting the area determining parameter, the prototype and the category correspondence matrix in the case where the prototype is judged as proper; and converting the selected category A to category B using the corrected category correspondence matrix.

The relation between the selected category A and the preset category B is added to the corrected category correspondence matrix in such a manner that in the case where the selected category A already corresponds to another category B, the addition of the relation of correspondence is rejected, the prototype of category A is corrected away from the input data, and the area determining parameter is corrected to a value equal to the distance between the prototype of the category A and the input data.

According to still another aspect of the invention, there is provided a data classification apparatus using any one of the above-mentioned data classification methods.

According to yet another aspect of this invention, there is provided an equipment diagnosis apparatus for diagnosing an equipment by inputting the equipment operating data input using the data classification apparatus, wherein the equipment operating data is input to the data classification apparatus and the equipment state is diagnosed based on the category into which the input data are classified.

As an alternative, the equipment state is given as a teacher pattern, the relation between the equipment state and the equipment operating data is learned by the data classification apparatus, the operating data before learning is input to the data classification apparatus after learning, and the equipment state is diagnosed by category B output from the data classification apparatus.

In the application of the invention to the fault detection and the fault diagnosis, the size of the category area can be set for each category, and therefore, a more proper data classification is made possible without reducing the judgment accuracy. Also, the smaller number of steps facilitates the packaging.

Other objects, features and advantages of the invention will become apparent from the following description of the embodiments of the invention taken in conjunction with the accompanying drawings.

BRIEF DESCRIPTION OF THE DRAWINGS

FIG. 7 is a diagram for explaining an example of a category correspondence matrix.

FIG. 11 is a diagram for explaining an example of the operating data.

FIG. 12 is a diagram for explaining an example of the maintenance data.

FIG. 13 is a diagram for explaining an example of the data input to the data classification apparatus according to the third embodiment.

DETAILED DESCRIPTION OF THE INVENTION

Figure 1:
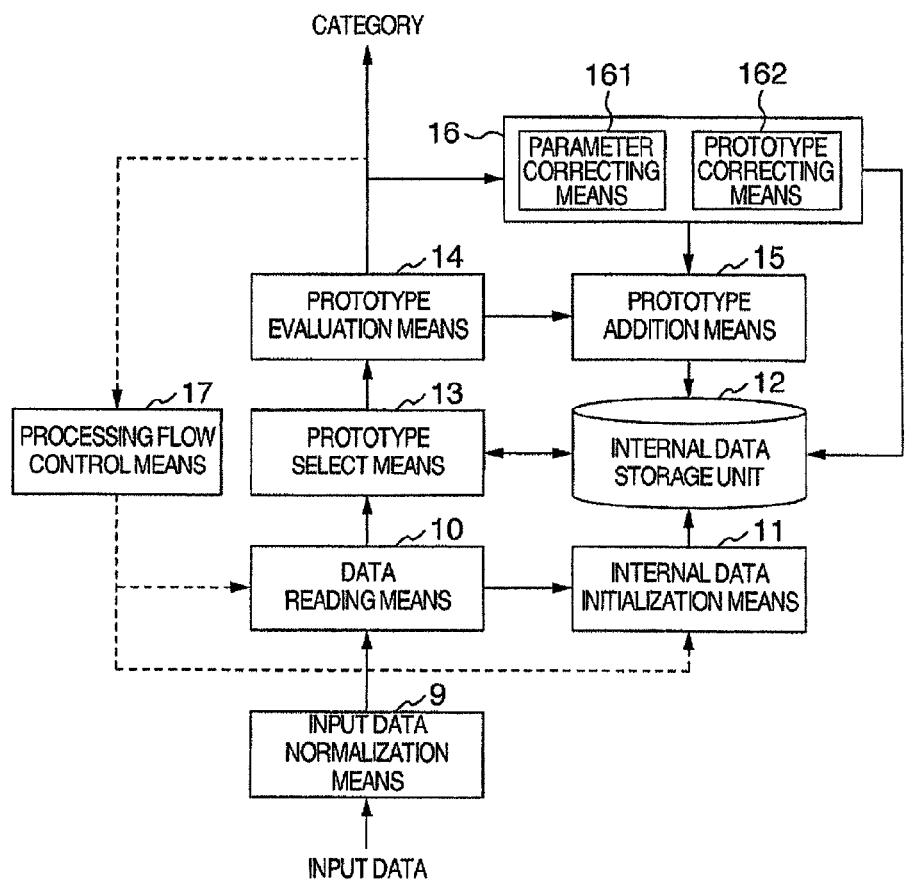
FIG. 1 is a block diagram showing the configuration of the data classification apparatus according to a first embodiment of the invention.

This invention is proposed in four parts, i.e. a first part of the invention for classifying a plurality of input data in the natural world into a plurality of categories, a second part of the invention for classifying a plurality of input data in the natural world into a plurality of preset categories B, a third part of the invention for diagnosing an equipment using the first part of the invention for classifying a plurality of input data into a plurality of categories, and a fourth part of the invention for diagnosing an equipment using the second part of the invention for classifying a plurality of input data into a plurality of preset categories B.

The data classification apparatus according to an embodiment of the first part of the invention, which is for classifying a plurality of input data received from an equipment or the like into a plurality of categories, includes an internal data storage unit 12 for storing an area determining parameter for specifying the category prototype and the size of the category area, a prototype select means 13 for selecting the prototype of the category most analogous to the input data that has been read, a prototype evaluation means 14 for determining whether the selected prototype is proper by evaluating the degree of analogy between the prototype and the input data based on the distance between the particular prototype and the input data, a prototype addition means 15 for creating a new prototype, and an internal data correcting means 16 adapted to correct at least one of the area determining parameter and the prototype.

In the prototype evaluation means 14, at least one of the area determining parameter and the prototype is corrected by the internal data correcting means 16 in the case where the prototype is judged as proper, while a new prototype is created by the prototype addition means 15 in the case where the prototype is not judged as proper.

The data classification apparatus according to an embodiment of the second part of the invention, which is for classifying a plurality of input data received from an equipment or the like into a plurality of categories B, includes an internal data storage unit 12 for storing an area determining parameter for specifying the prototype of category A related to category B and the size of the area of category A, a category correspondence matrix storage unit 21 for storing the category correspondence matrix for converting category A to category B, a prototype select means 13 for selecting the prototype of category A most analogous to the input data that has been read, a prototype evaluation means 14 for evaluating whether the selected prototype is proper or not based on the degree of analogy between the prototype and the input data, a prototype addition means 15 for creating a new prototype of category A, an internal data and matrix correcting means 18 for correcting at least one of the area determining parameter and the prototype and the category correspondence matrix, and a category conversion means 20 for converting the selected category A to category B using the category correspondence matrix.

In the operation of the internal data and matrix correcting means 18 to add the relation between the selected category A and the preset category B to the category correspondence matrix, assume that the selected category A already corresponds to another category B. The addition of the relation of correspondence is rejected. Once the addition is rejected, the prototype of category A is corrected away from the input data, and the area determining parameter is corrected to have an equal distance between the prototype of the category A and the input data.

The equipment diagnosis apparatus in an equipment diagnosis system according to an embodiment of the third part of the invention includes the data classification apparatus according to the first part of the invention, wherein the operating data of the equipment is input to the data classification apparatus and the equipment state is diagnosed based on the category into which the operating data is classified.

The equipment diagnosis system according to an embodiment of the fourth part of the invention includes the data classification apparatus according to the second part of the invention, wherein the equipment state is given as a teacher pattern and the relation between the equipment state and the equipment operating data is learned by the data classification apparatus. Further, the operating data before learning is input to the data classification apparatus after learning, so that the equipment state is diagnosed by category B output from the data classification apparatus.

First Embodiment

FIG. 1 is a block diagram showing the configuration of a data classification apparatus according to the first embodiment. This embodiment represents a data classification apparatus for classifying the input data into several categories. The categories into which the input data are desirably classified in advance are not given as teacher data, and therefore, the classification is a non-supervised one.

This data classification apparatus includes an input data normalization means 9, a data reading means 10, an internal data initialization means 11, a data storage unit 12, a prototype select means 13, an area properness evaluation means 14, a prototype addition means 15, an internal data correcting means 16 and a processing flow control means 17.

The input data normalization means 9 normalizes the input data. Generally, the input data is a physical quantity such as temperature, flow rate, voltage or signal intensity, and therefore, the magnitude of the value and the change amount are varied with the type and characteristic of the input data to be classified. In order to correct this variation, the input data normalization means 9 normalizes the data using the maximum and minimum values of the input data to be classified.

The data reading means 10 reads the normalized input data in accordance with the command of the processing flow control means 17. In the internal data initialization means 11, which is operated only in the beginning of the data classification process, the data stored in the internal data storage unit 12 is initialized in accordance with the input data.

The internal data storage unit 12 has stored therein the prototype of each category and the parameters (area determining parameters) for determining the area of each category. The prototype is a typical example of each category, and corresponds in one-to-one relation to the category. In the case where the input data is N-dimensional, the prototype is also the N-dimensional data. The area determining parameter is for specifying the area of each category and defined for each category.

The prototype select means 13 is the function to compare the input data with the prototype stored in the internal data storage unit 12 and select the prototype most analogous to the input data. A particular prototype analogous to the input data is determined from the distance between the input data and the prototype. Specifically, the distance between each input data and each prototype stored in the data storage unit 12 is calculated, and the prototype most analogous to the input data is selected.

The prototype evaluation means 14 evaluates whether the prototype selected by the prototype select means 13 is proper or not. Among the prototypes stored in the internal data storage unit 12, the selected prototype is most analogous but not necessarily sufficiently analogous to the input data. The prototype evaluation means 13 compares the distance $r_{mj}$ between the input data and the selected prototype j with the area determining parameter Rj, and in the case where Equation (1) is satisfied, judges that the selected prototype j is proper and determines the category into which the input data is classified, while at the same time executing the process of the internal data correcting means 16.

$$r_{mj} \leq R_j \tag{1}$$

In the case where Equation (1) fails to be satisfied, on the other hand, the process of the prototype addition means 15 is executed. The prototype addition means 15 adds a prototype in the case where the prototype evaluation means 14 judges that the selected prototype is not proper. The prototype is required to represent the input data, and therefore, the data in the neighborhood of the input data is added as a new prototype as described later. Incidentally, exactly the same data as the input data may be added as a prototype.

In the case where the selected prototype is proper, the internal data correcting means 16 corrects the prototype and the area determining parameter and thus secure a more proper data classification characteristic. For this purpose, the internal data correcting means 16 includes an area determining parameter correcting means 161 and a prototype correcting means 162. The area determining parameter correcting means 161 compares the area determining parameter with the distribution of the data contained in the category area, and in the case where the area determining parameter is large as compared with the data distribution, reduces the area determining parameter. The prototype correcting means 162 increases the analogy of the prototype to the input data. The degree to which the analogy of the prototype to the input data is increased can be adjusted by the parameter. The prototype is a typical example of a plurality of input data which are input as required. By executing the process of increasing the analogy of the prototype to the input data, the prototype can be set more properly.

The processing flow control means 17 controls the processing flow in the data classification apparatus. The main functions of the processing flow control means 17 are to cause the internal data initialization means 11 to operate in the case where the input data is first read, and to judge discontinuation of the repetitive process based on the change in the category output from the prototype evaluation means 14.

Next, the processing flow according to the first embodiment is explained in detail. According to this embodiment, the input data, though two-dimensional, may alternatively be at least three-dimensional with equal effect.

Figure 4:
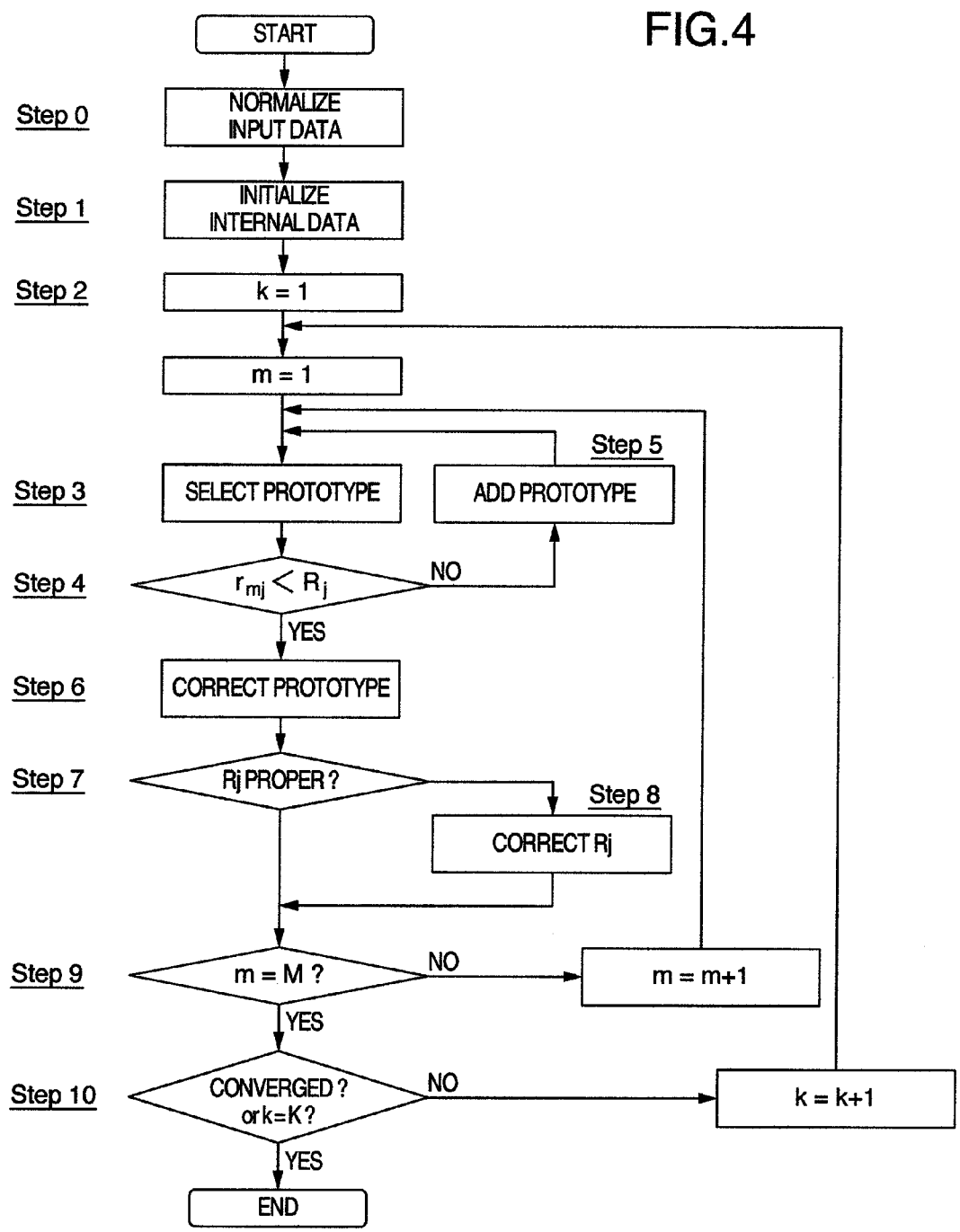
FIG. 4 is a flowchart showing the process of the learning operation according to the first embodiment.

FIG. 4 shows the operation flow of the data classification apparatus according to the first embodiment. In this flowchart, M sets of the input data (X, Y) and the teacher category are assumed to exist. According to this data classification method, the data can be properly classified by giving M sets of data several times repeatedly. According to this embodiment, the M sets of the data are repeatedly given the number of K times. Now, the processing flow is explained.

In step 0, the data (X, Y) are normalized. Assume, for example, that the data X is the temperature and the data Y the flow rate, which undergo a change in the range of 500° C. to 560° C. and 2.5 t/h to 3.5 t/h, respectively. In step 0, X and Y are both normalized to the minimum value of 0.1 and the maximum value of 0.9.

In step 1, the area determining parameter and the prototype constituting the internal data are initialized. The initialization of the prototype is to create a new prototype. According to this embodiment, the prototype (Xj, Yj) (j=1 to 5) is created. The initial prototype is desirably distributed as far as possible, and therefore, sets of x and y where x and y assume any values of 0.1 to 0.9 are created using random numbers. Some examples of the prototype are (0.45, 0.28), (0.78, 0.31), (0.15, 0.17), (0.54, 0.39) and (0.78, 0.12).

The area determining parameter Rj is created according to Equation (2).

$$Rj = K\_R \times \sqrt{N} \tag{2}$$

where K_R is a constant and N the number of dimensions of the input data. This indicates the resolution of dividing the largest length of a supercube with the coordinate surrounded by 0 to 1 as 1/(2×K_R) in the N-dimensional space. According to this embodiment, K_R=0.1 and N=2, and therefore, the initial value of R is 0.1414.

In step 2, the data of the input data number m=1 is read in the first session of repetition.

In step 3, the distance $r_{mj}$ between the input data (x, y) that have been read and the prototype (Xj, Yj) is calculated by Equation (3).

$$r_{mj} = \sqrt{((x-Xj)^2 + (y-Yj)^2)} \tag{3}$$

The value j at which the distance $r_{mj}$ is minimized is selected as a candidate for the prototype.

In step 4, the properness of the prototype is evaluated. Specifically, $r_{mj}$ is compared with a reference area determining parameter Rj, and in the case where $r_{mj}$ is smaller than Rj, the selected prototype is judged as proper and the process of step 6 is executed. Unless the prototype is proper, the process of step 5 is executed.

In step 5, one new prototype is added. The prototype to be added is determined by Equations (4) and (5).

$$X'j = kp \times x_m \tag{4}$$

$$Y'j = kp \times y_m \tag{5}$$

where kp is a parameter assuming a value in the neighborhood of unity. In the case where kp=1, for example, the prototype is equal to the input data $x_m$, $y_m$.

Step 6 is the process executed in the case where the prototype is judged as proper in step 4. In step 6, the prototype is corrected to the input data. Specifically, the correction is made by Equations (6) and (7).

$$X'j = Xj + kw \times (x_m - Xj) \tag{6}$$

$$Y'j = Yj + kw \times (y_m - Yj) \tag{7}$$

where kw is a parameter assuming the value of 0 to 1, and the degree to which the correction is made to the input data is determined by the value kw. In the case where kw=1, it indicates that the prototype is corrected until it completely coincides with the input data. In the case where kw=0, on the other hand, the prototype is not corrected.

The value kw is changed stepwise in accordance with the progress of the data classification process. Specifically, the value kw is increased in the initial stage of the process so that the prototype is changed with the input data, while after some progress of the process, the value kw is decreased so that the prototype remains unchanged.

In step 7, the area determining parameter Rj is judged as proper or not from the data contained in the area of the selected category. In the process, the prototype of the selected category and the maximum value $r_{mj}$_max of the distance $r_{mj}$ of the input data contained in the category are determined, and the ratio F_r thereof to Rj is calculated by Equation (8).

$$F\_r = r_{mj}\_max / Rj \tag{8}$$

A preset threshold value F_r_th is compared with F_r determined by Equation (8), and if Equation (9) is established, the area determining parameter Rj is judged as proper and the process proceeds to step 9. Unless Equation (9) is established, on the other hand, the area determining parameter Rj is judged as improper, and the process proceeds to step 8.

$$F\_r \geq F\_r\_th \tag{9}$$

In step 8, the area determining parameter Rj is changed in accordance with Equation (10).

$$Rj = r_{mj}\_max / F\_r\_th \tag{10}$$

Step 9 judges whether all the M sets of the input data are processed or not, and any input data which are not processed are processed in step 3. In the case where all the input data are processed, on the other hand, the process proceeds to step 10.

In step 10, the process is ended in the case where the number of times repeated reaches the set value K or the data classification process is complete. The completion of the data classification is judged according to whether the categories into which the input data are classified are the same in the current session (k-th session) as in the previous session ((k−1)th session). In the case where at least one of the categories into which the input data are classified undergoes a change, the process is judged as not complete, while in the case where all the categories into which the input data are classified are identical, the process is judged as completed.

According to the first embodiment, the process shown in FIG. 4 is executed from k=1.

Alternatively, the process of steps 7 to 8 may not be executed until k reaches a certain value, and once k exceeds the particular value, the process of steps 7 to 8 may be executed.

Figure 5:
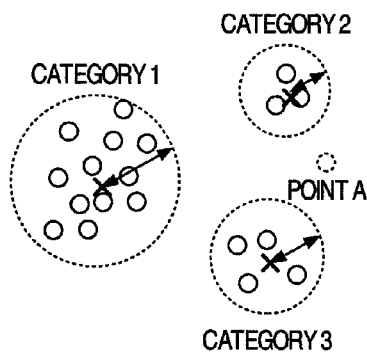
FIG. 5 is a schematic diagram showing the classification result according to the first embodiment.

FIG. 5 is a schematic diagram showing the classification result according to the first embodiment. The input data are identical with those of FIG. 2, and classified into three categories. The dashed lines indicating the boundaries of category 2 and category 3, however, are set nearer to the data than in the case of FIG. 2. This is due to the fact that the result of judging the properness of Rj specifying the size of the category area in step 7 shows that Rj is too large, and the value Rj is corrected downward in step 8.

Figure 2:
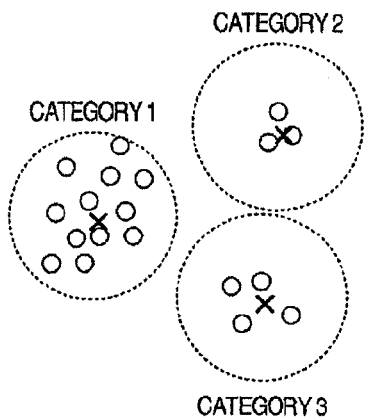
FIG. 2 is a schematic diagram showing an example of the classification result according to a conventional technique.

As described above, according to this embodiment, the dashed line indicating the category boundary is set in accordance with the data distribution, and therefore, the data are not concentrated at the center of the area as shown in FIG. 2. In other words, the category area is determined faithfully to the input data given.

According to this classification method, therefore, the difference of the data trend can be accurately grasped. According to the conventional classification method (FIG. 2), the point A in FIG. 5, for example, though different in trend from the classified data, is classified as category 2 that has occurred, and therefore, the change in the trend thereof cannot be grasped. According to this embodiment, on the other hand, the category boundary is set more properly, and therefore, the point A is classified as a new category (category 4), thereby making it possible to grasp the data trend.

An application of the classification method according to this embodiment to the fault detection or the fault diagnosis, therefore, can improve the judgment accuracy. Also, since the process according to this embodiment is simplified more than the conventional method, the packaging is easy even in the case where the restriction of the hardware packaged demands simplification of the process.

Second Embodiment

Next, a second embodiment of the invention is explained. This embodiment represents a data classification method to learn the category corresponding to the input data in advance. The category constituting the classification result according to the first embodiment and the category learned in advance are not necessarily in one-to-one relation. Thus, an explanation is given assuming that the category constituting the classification result according to the first embodiment is defined as category A, and the category learned in advance as category B.

Figure 6:
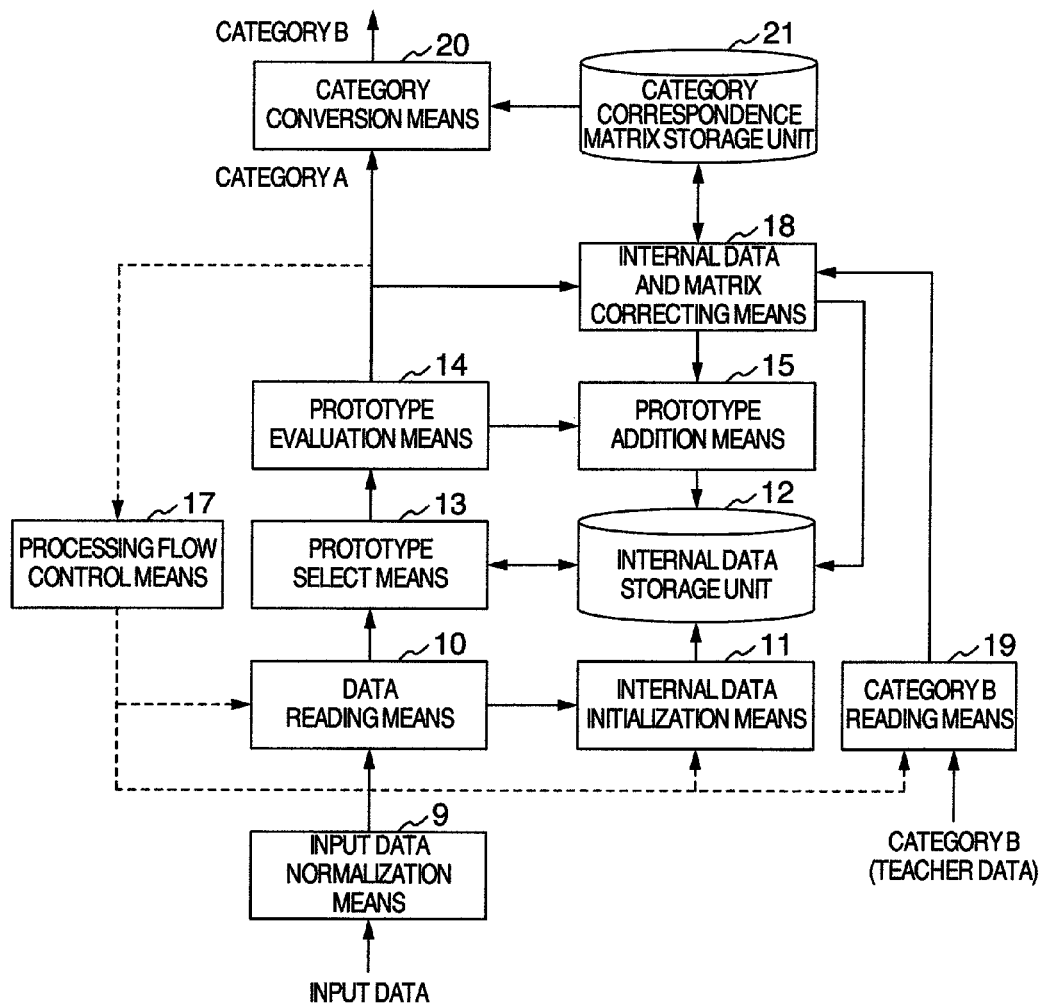
FIG. 6 is a block diagram showing the configuration of the data classification apparatus according to a second embodiment of the invention.

FIG. 6 is a block diagram showing the configuration of the data classification apparatus according to the second embodiment. Many of the component elements of the second embodiment are identical with the corresponding ones of the first embodiment, and therefore, the different points from the first embodiment are mainly explained below. The component elements newly added in the second embodiment include a category B reading means 19, a category conversion means 20 and a category correspondence matrix 21. Also, the internal data correcting means 16 in the first embodiment is replaced by the internal data and matrix correcting means 18.

The category B reading means 19 is for reading the category B constituting the data (teacher data) learned in advance. Like in the input data reading means 10, the data read timing of the category B reading means 19 is controlled by the processing flow control means 17.

The category conversion means 20 is for converting category A to category B. Category A is identical with the category into which the data are classified in the first embodiment and represents one group into which several analogous data are classified. Category A is assigned the category number which has no special meaning. Category B, on the other hand, is given a meaning by the human being. In the case where this data classification method is used for fault diagnosis, category B is assigned such event as "normal", "fault 1" or "fault 2".

Category A is converted to category B using the category correspondence matrix indicating the correspondence between category A and category B. The category correspondence matrix storage unit 21 has stored therein the category correspondence matrix.

FIG. 7 shows an example of the category correspondence matrix. In this case, category B is of three types including "normal", "fault 1" and "fault 2". Category A, on the other hand, is of ten types including categories 1 to 10. A plurality of categories A correspond to one category B. Also, each category A always corresponds to only one category B and never more than one category B. By determining category A using this category correspondence matrix, the conversion to category B is made possible.

The internal data and matrix correcting means 18 corrects the internal data stored in the internal data storage unit 12 and the category correspondence matrix stored in category correspondence matrix storage unit 21.

The internal data corrected are the prototype and the area determining parameter as in the internal data correcting means 16 according to the first embodiment. The correcting method, however, is different from that of the internal data correcting means 16. In the internal data and matrix correcting means 18, as shown in FIG. 7, the internal data are corrected in such a manner that not more than two categories B correspond to category A. A specific correction algorithm is explained later.

The category correspondence matrix is corrected in such a manner that the relation between categories A and B always coincides with the latest input data classification result. Category B corresponding to each input data is given as a teacher data and remains unchanged. In the case where the prototype or the area determining parameter undergoes a change, however, category A may change for the same input data. In the case where category A changes, therefore, the correspondence with category B is corrected as required.

Next, the operation of the second embodiment is explained. The operation mode of the second embodiment is of two types including the learning mode and the judgment mode. The learning mode is an operation mode in which the input data and category B (teacher data) are given to learn to classify the input data as category mode B. The judgment mode is an operation mode in which only the input data are given to judge category B into which the input data are classified. Incidentally, the input data, like in the first embodiment, is the two-dimensional data (x, y).

Figure 8:
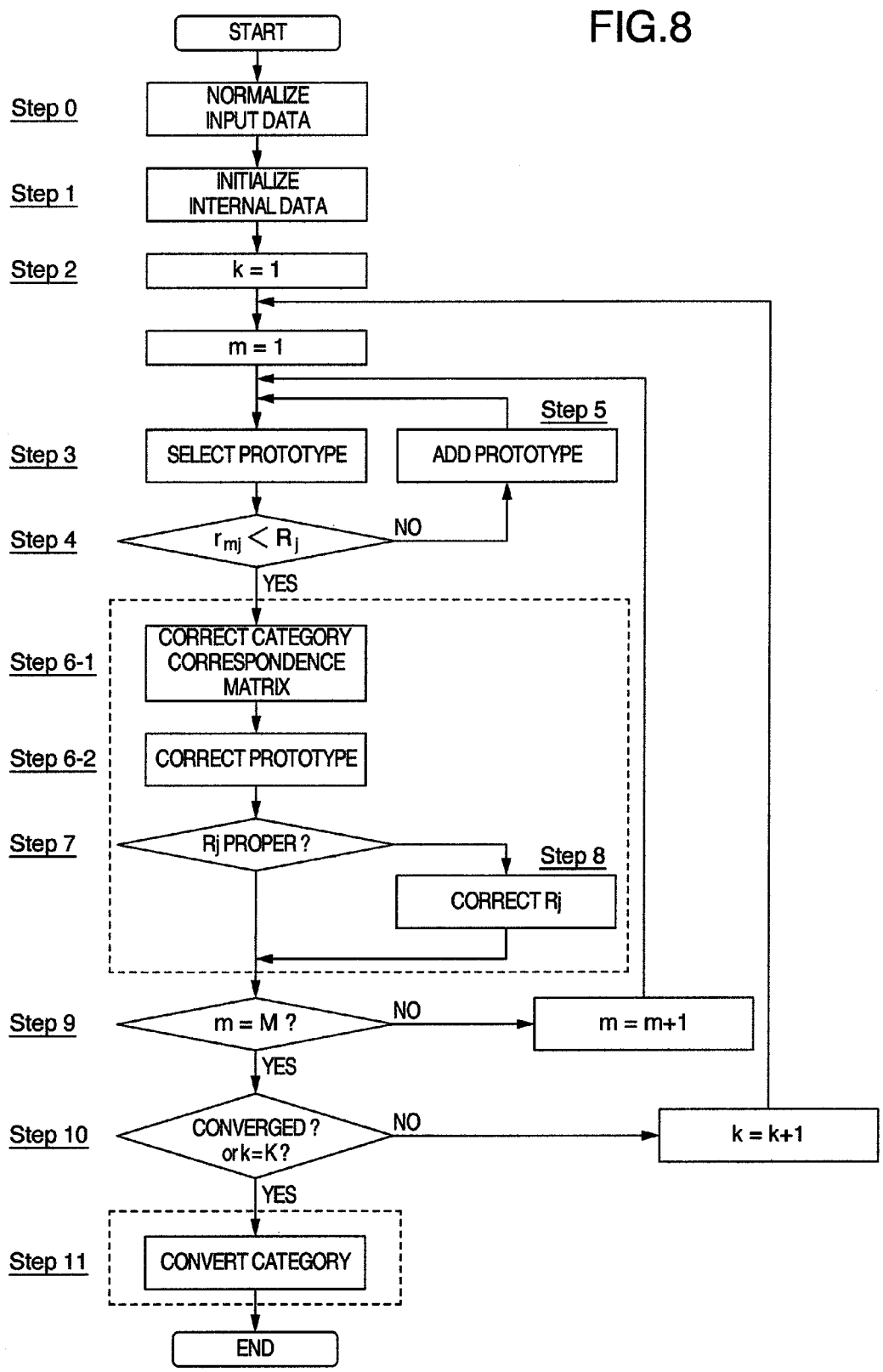
FIG. 8 is a flowchart showing the process of the learning operation according to the second embodiment.

FIG. 8 shows the processing flow in learning mode. In FIG. 8, the part defined by dashed line is different from the processing flow of the first embodiment. The processing flow is explained below mainly with reference to the different part.

In steps 0 to 5, the input data are normalized, the internal data such as the prototype are initialized, and the prototype of category A into which the input data are classified is determined.

In step 6-1, the relation between category A into which the input data are classified and category B given as a teacher data is added to the category correspondence matrix. The addition is rejected, however, in the case where the correspondence between the selected category A and another category B is already recorded as a combination between category A and category B to be added. Also, the correspondence between category A and category B, if already recorded in the matrix, is not corrected.

In step 6-2, the process of correcting the prototype is varied depending on whether the addition is rejected or not in step 6-1. In the case where the addition is not rejected in step 6-1, the prototype is corrected by Equations (6) and (7). In the case where the addition is rejected in step 6-1, on the other hand, it indicates that category A into which the input data are classified is not suitable. The prototype is required to be corrected, therefore, not to be classified into category A into which the intended input data are classified. Specifically, the prototype is corrected according to Equations (11) and (12).

$$X'j = Xj - kw \times (x_m - Xj) \tag{11}$$

$$Y'j = Yj - kw \times (y_m - Yj) \tag{12}$$

In the case where kw>0 in Equations (11) and (12), the prototype is corrected away from the input data. The prototype is corrected in this way to the greater degree with the increase in value kw. In the case where kw=0, on the other hand, the prototype is not changed.

In step 7, the properness of Rj is judged differently depending on whether Equation (9) is established or not and whether the addition is rejected or not. In the case where Equation (9) is established and the addition is not rejected, Rj is judged as proper and the process proceeds to step 9. In the case where Equation (9) fails to be satisfied or the addition is rejected, on the other hand, Rj is judged as not proper, and the process proceeds to step 8.

In the case where the addition is rejected, it indicates that category A into which the input data are classified is not suitable. Therefore, the area determining parameter is required to be corrected not to classify the intended input data into the particular category A. Specifically, the correction is made according to Equation (13).

$$Rj = r_{mj} \tag{13}$$

Also, in the case where Equation (9) fails to be satisfied, Rj is corrected by Equation (10).

Steps 9 and 10 judge whether the process is repeated or not, and in the case where the repetition is required, the process proceeds to step 11. Once the entire process up to step 10 is completed, all the M input data are classified into a given category A, and the correspondence between each category A and category B is recorded in the category correspondence matrix.

In step 11, category A is converted to category B using the category correspondence matrix. M input data are converted in the process. In the case where the example shown in FIG. 7 is used as a matrix, assume that category A of a given input data is category 3. Then, the corresponding category B is "fault 1" and category 3 is converted to fault 1.

With the process described above, M input data can be classified into category B given as teacher data.

Incidentally, the process of steps 6-1 to 8, excepting the process related to the category correspondence matrix, is identical with the process of steps 6 to 8 in the first embodiment. According to the second embodiment, the process shown in FIG. 8 is executed from k=1. Nevertheless, before k reaches a certain value, the process related to the category correspondence matrix may not be executed but only the process of steps 6 to 8 of the first embodiment may be executed, and after k exceeds the certain value, the process related to the category correspondence matrix may be added to the processing flow.

Figure 15:
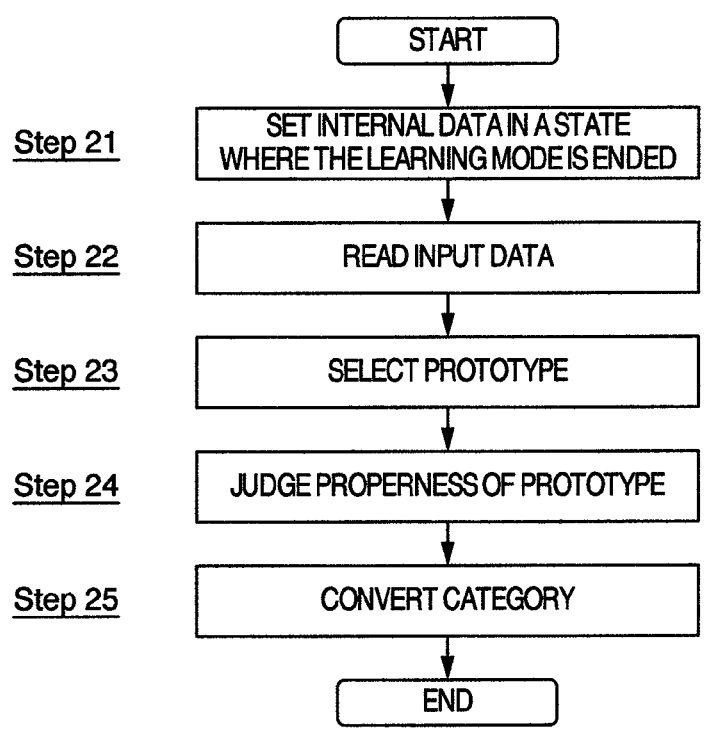
FIG. 15 is a flowchart showing a judgment mode.

Next, the judgment mode is explained with reference to a case in which one input data is judged as shown in FIG. 15.

In step 21, the internal data is set in a state where the learning mode is ended.

In step 22, the input data is read.

In step 23, the prototype is selected with the same algorithm as in step 3 in learning mode.

In step 24, the properness of the prototype is judged with the same algorithm as in step 4 in learning mode. As long as the prototype is proper, category A of the input data is judged as category A having the selected prototype, and the process proceeds to step 25. Otherwise, category A of the input data is judged as a new category, and the process proceeds to step 25.

In step 25, category A is converted to category B with an algorithm similar to that of step 11 in learning mode. In the case where category A of the input data is a new category, however, category B becomes indefinite since the relation of correspondence is not recorded in the category correspondence matrix.

Figure 3:
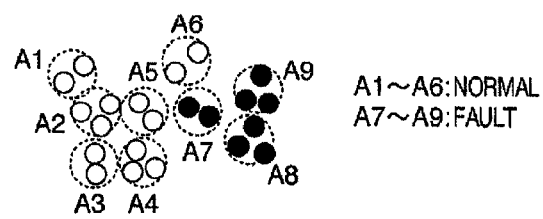
FIG. 3 is a schematic diagram showing the classification result according to another conventional technique.
Figure 9:
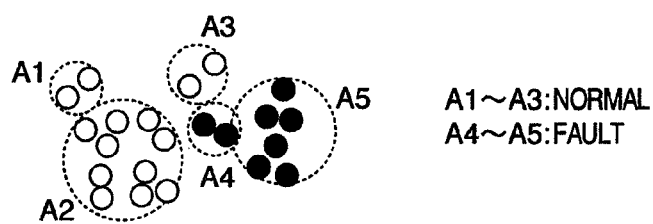
FIG. 9 is a schematic diagram showing the classification result according to the second embodiment.

The effect of the second embodiment is explained. FIG. 9 shows the result of data classification in learning mode. In FIG. 9, the input data and the teacher data are identical to those of FIG. 3. The input data shown in FIG. 3 are classified into four categories A including categories A2 to A5. The input data shown in FIG. 9, however, are classified into a single category A, i.e. category A2.

In the conventional method, the area determining parameter for determining the size of the category area is shared by all the categories. A reduction in the area determining parameter of a given category reduces all the area determining parameters, thereby classifying the categories unnecessarily in detail. Assuming that the data for diagnosing a new data in judgment mode is the area surrounded by the categories A2 to A4 in FIG. 3, the conventional technique can make judgment as neither fault nor normal (indefinite), thereby causing a reduced judgment accuracy.

According to the second embodiment, however, the area determining parameter is defined for each category, and in steps 7 and 8, corrected for each category, thereby eliminating the need of unnecessary detailed classification of the categories. As a result, according to the second embodiment, as shown in FIG. 9, the data are classified in a proper area, and therefore, the judgment result is rarely indefinite, thereby improving the judgment accuracy. Also, the reduced number of categories can effectively reduce the memory capacity required in packaging. Thus, the packaging is facilitated even in the case where the hardware packaged is limited in memory capacity.

Third Embodiment

Next, a third embodiment of the invention is explained. According to the third embodiment, there is provided a remote diagnosis system for the power generating plant utilizing the data classification apparatus according to the second embodiment of the invention.

Figure 10:
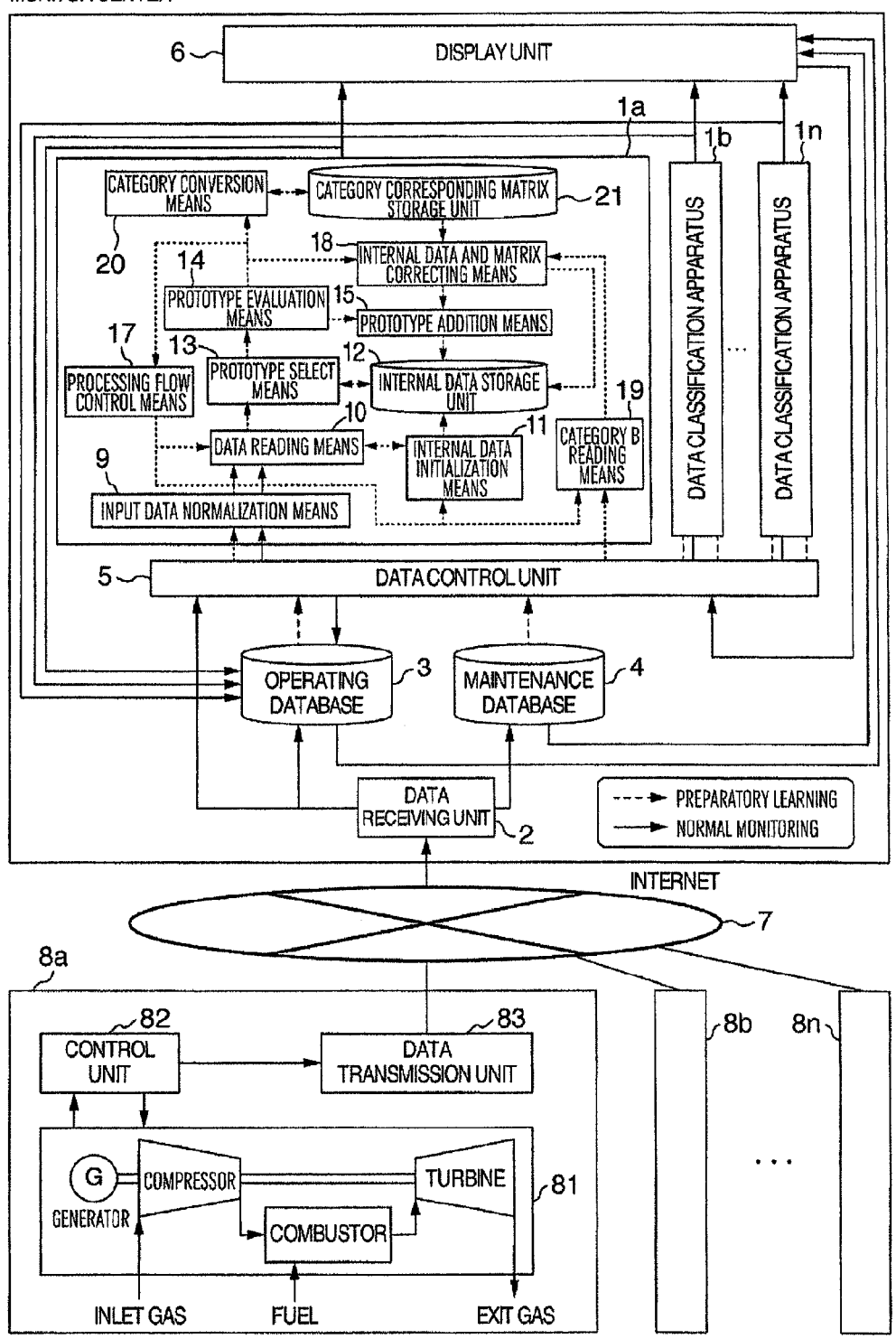
FIG. 10 is a diagram for explaining the outline of an equipment diagnosis apparatus according to a third embodiment of the invention.

FIG. 10 shows the configuration of the third embodiment. The remote diagnosis system according to this embodiment includes power generating equipments 8a to 8n and a monitor center, which are connected to each other through an internet 7.

The power generating equipments 8a to 8n are each configured of a gas turbine generator 81, a control unit 82 and a data transmission unit 83. The gas turbine generator 81 includes a compressor, a combustor, a turbine and a generator. The air compressed by the compressor is sent to the combustor, and after being mixed with a fuel, combusted therein. The high-pressure gas generated by the combustion rotates the turbine and generates electric power.

The control unit 82 controls the output of the turbine generator in accordance with the power demand. Also, the control unit 82 measures the operating data of the turbine generator 81 is measured using a sensor mounted in the generator 81. According to this embodiment, the state quantities including the inlet gas temperature, the fuel flow, the turbine exit gas temperature, the turbine speed and the generated energy of the generator are measured as operating data at intervals of one second. The operating data measured in the control unit 82 are transmitted to the monitor center through the internet 7 from the data transmission unit 83.

The monitor center monitors the state of the power generating equipments 8a to 8n by receiving the operating data on the power generating equipments 8a to 8n received through the internet 7. The monitor center includes a data receiving unit 2, an operating database 3, a maintenance database 4, a data control unit 5, data classification apparatuses 1a to 1n and an operation terminal 6.

The data receiving unit 2 sends the received data to each database and the data control unit 5. The operating data sent from the power generating equipments 8a to 8n are sent to both the data control unit 5 and the operating database 3 at the same time. The maintenance information is sent to the maintenance database 4. The maintenance information input from the portable terminal by the maintenance worker is also sent to the maintenance database 4.

The operating data sent from the data receiving unit 2 are stored in the operating database 3 for each of the power generating equipments 8a to 8n. An example of the data stored in the operating database 3 is shown in FIG. 11. The measurement items include the state quantities such as the inlet gas temperature, the fuel flow, the turbine exit gas temperature, the turbine speed and the generated energy of the generator, each of which is recorded per second. In addition to these measurement data, the operation mode is recorded. The operation mode is recorded by numerical values corresponding to "start-up operation", "full load operation", etc. In the case of FIG. 11, "0" is noted as a value corresponding to "full load operation". Further, in addition to the data transmitted from the power generating equipments, the result of classification by the data classification apparatuses 1a to 1n is stored. The classification result is of two types. One is the number of category A in the data classification apparatus, and the other is the device state (category B) such as "normal" or "fault A" which is recorded also by the number corresponding to the state.

The maintenance database 4 has stored therein the maintenance information sent from the data receiving unit 2. The maintenance database 4 has recorded therein the information on the maintenance conducted by the maintenance worker. FIG. 12 shows an example of the maintenance information accumulated in the maintenance data base. In the case of FIG. 12, the actual maintenance work is conducted, for example, as a series of operations described below. Specifically, an alarm is generated and a fault is confirmed by monitoring at 9:50; the maintenance worker arrives at the site and starts the maintenance work at 10:30; the parts are replaced at 10:45 after which the test operation of the gas turbine generator is conducted; and the restoration of the fault is confirmed and the maintenance work finished at 11:30.

In the data control unit 5, the operating data and the maintenance data are classified according to the site and the operation mode, and processed into a form adapted for input to the data classification apparatuses 1a to 1n. An example of the data thus processed is shown in FIG. 13. This data classification and processing method is explained in detail later. Also, the data classification apparatus has an estimation mode, a learning mode and a preparation mode. The data control unit 5 controls the input data in accordance with the prevailing mode.

A mode switching command of the data control unit 5 is input at the operation terminal 6. Also, the information recorded in the operating database 3 or the maintenance database 4 or the result of classification by the data classification apparatuses 1a to 1n can be output on the monitor screen.

The data classification apparatuses 1a to 1n diagnose the state of the power generating equipments 8a to 8n based on the operating data sent from the data receiving unit 20. The diagnosis result is sent to the operating database 3. In learning mode, the relation between the operating data and the state of the power generating equipments is learned using the information stored in the operating database 3 and the maintenance database 4. In preparation mode, on the other hand, neither learning nor estimation is carried out. This mode is introduced in the absence of the data required for learning, for example, in the case where a new site is installed. These modes can be individually set for each of the diagnosis units 1a to 1n. Each mode is set at the operation terminal 6.

Next, the operation of the monitor center is explained. The data classification apparatuses 1a to 1n actually operate in one of two modes, i.e. the learning mode and the estimation mode. The learning mode and the estimation mode are explained below in that order. As described above, the learning mode and the estimation mode can be set individually for each site. For the present purpose, an explanation is given about a case in which all the plural sites are in learning mode or estimation mode.

In learning mode, the relation between the operating data and the state of the power generating equipments is learned using the information stored in the operating database 3 and the maintenance database 4. The information stored in these data bases, however, cannot be input as they are into the data classification apparatuses 1a to 1n. Thus, the data control unit 5 converts the operating data and the maintenance data into a data form adapted for input to the data classification apparatuses 1a to 1n.

Figure 14:
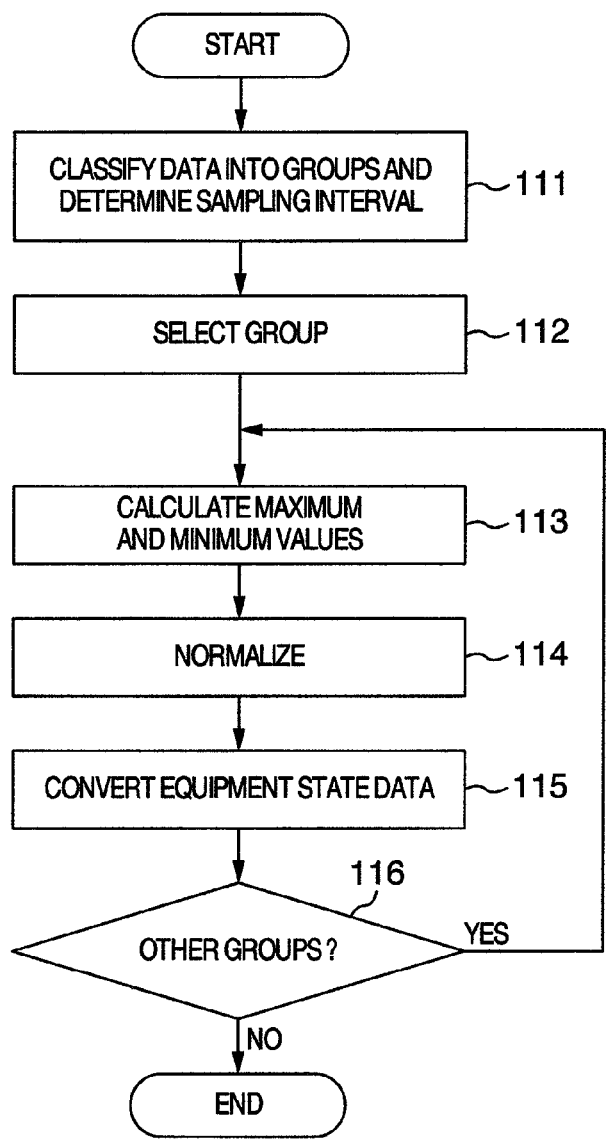
FIG. 14 is a flowchart showing the process of data conversion in the data control unit according to the third embodiment.

FIG. 14 is a flowchart showing the process of converting the data into the form adapted for input to the data classification apparatuses. Incidentally, the description that follows is assumed that only five measurement items (DATA1 to DATA5) shown in FIG. 11 are involved.

In step 111, all the operating data are grouped according to site and operation mode, and the interval at which the data of each group is sampled is determined. In the case where the three operation modes including "start-up operation", "full load operation" and "shut-down operation" are involved for three sites 1 to 3, for example, the operating data are classified into a total of nine groups. The interval at which the data are sampled varies with the operation mode. According to this embodiment, the data are sampled at the interval of one minute in the "full load operation" small in the change of the operating data, and at the interval of one second in the other modes.

In step 112, one of the groups into which the data are classified in step 111 is selected.

In step 113, the maximum and minimum values are calculated for each measurement item of DATA1 to DATA5 using the data associated with the group selected in step 112. Assuming that the data on "full load operation" mode of "site 1" covers 100 hours, for example, the number of the data for each item is 6000, and the maximum and minimum values are calculated from the 6000 data. Incidentally, the maximum and minimum values calculated in step 113 are stored in the data control unit 5 for each site.

In step 114, the data are normalized using the maximum and minimum values determined in step 113. The method is explained taking DATA1 as an example. Assume that the number of the data DATA1 is M and the m-th measurement value is designated as data(m). Also, assume that the maximum and minimum values of the M data are Max_1 and Min_1, respectively. Then, the normalized data Ndata_1($m$) is calculated by Equation (14).

$$N\text{data}\_1(m) = \alpha + (1-\alpha) \times (\text{data}\_1(m) - \text{Min}\_1)/(\text{Max}\_1 - \text{Min}\_1) \quad (14)$$

where $\alpha$ is a constant ($0 \leq \alpha < 0.5$). The data is normalized in the range of $[\alpha, 1-\alpha]$ by Equation (1). According to this embodiment, $\alpha$ is set to 0.2.

The data Ndata_1($m$) to Ndata_5($m$) of five items generated in step 114 constitute input data a which are input to the data classification apparatuses 1$a$ to 1$n$.

In step 115, the data of category B is generated by converting the data on the device state. The maintenance database 4 has recorded therein the device states. Three types of states "normal", "fault A" and "fault B", for example, are converted into the numerical data such as "1", "2" and "3", respectively. Nevertheless, the equipment state is not recorded at regular time intervals in the maintenance database 4, and therefore, the data are processed in accordance with the time interval of the input data a. By correcting the time interval in this way, the operating data at a given timing with the equipment state at the same timing can be acquired as the data in correspondence with each other.

Step 116 judges whether the process of steps 113 to 115 has been executed for all the groups into which the data are classified in step 111. In the case where there are any groups for which the process is yet to be executed, steps 113 to 115 are executed for the data corresponding to the particular groups. This operation is ended upon complete execution of the process for all the groups.

By executing the process as described above, as many pairs of the input data and the corresponding category B as the groups into which the data are classified in step 111 are generated. These data pairs are input to different ones of the data classification apparatuses 1$a$ to 1$n$, respectively.

Next, the operation of the data classification apparatuses 1$a$ to 1$n$ is explained. The data classification apparatuses 1$a$ to 1$n$ learn the relation between the input data and category B. The input data and category B are both in the number of M. According to this embodiment, M sets of data are input sequentially to the data classification apparatuses 1$a$ to 1$n$. The algorithm for learning the relation between M sets of input data and category B is explained in detail above with reference to the second embodiment, and therefore, not explained in this embodiment. Upon completion of learning, the prototype acquired by the learning is held in internal storage area of the data classification apparatuses 1$a$ to 1$n$.

Next, the operation in estimation mode is explained. In estimation mode, the state of the power generating equipments 8$a$ to 8$n$ is diagnosed based on the operating data sent from the data receiving unit 2 at intervals of one minute. The data sent from the data receiving unit 2 are processed by the data control unit 5 and sent to the data classification apparatuses 1$a$ to 1$n$.

The data control unit 5 has stored therein the maximum and minimum values for normalizing the data for each site. The data sent from the data receiving unit 2, therefore, are converted into other data instantaneously by the process of step 114 in learning mode and input to the data classification apparatuses 1$a$ to 1$n$. The data classification apparatuses 1$a$ to 1$n$ have stored therein the prototype obtained in learning mode, and therefore, category A and the state (category B) of the power generating equipments are estimated through the steps explained with reference to the estimation mode in the second embodiment. The category A and the state of the power generating equipments thus estimated are output to the monitor screen of the operation terminal 6 on the one hand and may be held in the operating database 3 on the other hand.

Incidentally, the third embodiment uses the data classification apparatus of the second embodiment. Nevertheless, the data classification apparatus according to the first embodiment can be used also with equal effect.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A data classification method for classifying a plurality of input data in the natural world into a plurality of preset categories B using a computer, comprising the steps of:
    storing the prototype of category A related to the categories B, an area determining parameter for specifying the size of the area of category A and a category correspondence matrix for converting category A into one of the categories B;
    normalizing the input data;
    selecting the prototype of category A nearest to the normalized input data;
    evaluating whether the selected prototype is proper or not based on the distance between the selected prototype and the input data;
    repeating the prototype selection by adding a new prototype in the case where the prototype is not judged as proper while correcting the prototype of the category nearest to the normalized input data so as to minimize a distance of the nearest prototype to said input data and the category correspondence matrix in the case where the prototype is judged as proper; and
    converting the selected category A into said one of said categories B using the corrected category correspondence matrix,
    wherein the relation between the selected category A and the preset category B is added to the corrected category correspondence matrix in such a manner that in the case where the selected category A already corresponds to another category B, the addition of the relation of correspondence is rejected, the prototype of category A is corrected away from the input data and the area determining parameter is corrected to a distance equal to the distance between the prototype of category A and the input data.

2. A data classification apparatus for classifying a plurality of input data into a plurality of categories B, comprising:
    an internal data storage unit for storing a prototype of category A related to the category B and an area determining parameter for specifying the size of the area of category A;
    a category correspondence matrix storage unit for storing the category correspondence matrix for converting category A to category B;
    a prototype select unit for selecting the prototype of category A nearest to the input data that has been read;
    a prototype evaluation unit for evaluating whether the prototype is proper or not based on the distance between the prototype and the input data;
    a prototype addition unit for generating the prototype of category A anew;
    an internal data and matrix correcting unit for correcting the area determining parameter, the prototype and the category correspondence matrix; and
    a category conversion unit for converting the selected category A to category B using the category correspondence matrix;
    wherein the internal data and matrix correcting means adds the relation between the selected category A and the preset category B to the category correspondence matrix in such a manner that in the case where the selected category A already corresponds to another category B, the addition of the relation of correspondence is rejected, the prototype of category A is corrected away from the input data, and the area determining parameter is corrected to a value equal to the distance between the prototype of category A and the input data.

3. An equipment diagnosis apparatus for diagnosing an equipment by inputting the operating data of the equipment, comprising:
   the data classification apparatus described in claim 2;
   wherein the equipment state is given as a teacher pattern, the relation between the equipment state and the equipment operating data is learned by the data classification apparatus, the operating data before learning is input to the data classification apparatus after learning, and the equipment state is diagnosed by category B output from the data classification apparatus.

4. The equipment diagnosis apparatus according to claim 3,
   wherein the maximum value and the minimum value of the operating data of the equipment are calculated for each measurement item, and the data are normalized using the maximum value and the minimum value thus obtained.

* * * * *